United States Patent [19]
Ueda

[11] Patent Number: 5,859,942
[45] Date of Patent: Jan. 12, 1999

[54] OPTICAL COUPLING DEVICE

[75] Inventor: Tetsuji Ueda, Tokyo, Japan

[73] Assignee: NEC Corporation, Tokyo, Japan

[21] Appl. No.: 856,143

[22] Filed: May 14, 1997

[30] Foreign Application Priority Data

May 14, 1996 [JP] Japan .................................. 8-118791

[51] Int. Cl.⁶ .................................................. G02B 6/30
[52] U.S. Cl. ................................ 385/49; 385/33; 385/34; 385/52; 385/88; 385/93
[58] Field of Search ................................ 385/14, 33, 34, 385/49, 52, 88, 89, 93, 92

[56] References Cited

U.S. PATENT DOCUMENTS

| | | | |
|---|---|---|---|
| 3,894,789 | 7/1975 | Kobayashi et al. | 385/34 X |
| 4,466,696 | 8/1984 | Carney | 385/49 X |
| 4,969,712 | 11/1990 | Westwood et al. | 385/14 X |
| 5,355,386 | 10/1994 | Rothman et al. | 372/50 |
| 5,357,593 | 10/1994 | Bossler | 385/49 |
| 5,526,454 | 6/1996 | Mayer | 385/49 |
| 5,684,902 | 11/1997 | Tada | 385/88 |

FOREIGN PATENT DOCUMENTS

| | | | |
|---|---|---|---|
| 3-73905 | 3/1991 | Japan | 385/49 X |
| 3-287207 | 12/1991 | Japan | 385/49 X |
| 5-333248 | 12/1993 | Japan | 385/49 X |

*Primary Examiner*—Brian Healy
*Attorney, Agent, or Firm*—Young & Thompson

[57] ABSTRACT

An optical coupling device for optically coupling a laser light source with an optical waveguide having low coupling loss. A V-shaped groove is provided near an input end of an optical waveguide, and a short GI optical fiber is mounted in the V-shaped groove. By aligning the optical axes of the optical waveguide and the GI optical fiber, laser light emitted from a laser light source can be focused on a point on the input end surface of the optical waveguide by the optical beam focusing property of the GI optical fiber, caused by the parabolic distribution of the refractive index of the core of the short GI optical fiber in the radial direction. Leakage of the optical energy outside of the optical waveguide core can be prevented, and the laser light source and the optical waveguide can be optically connected with low coupling loss.

20 Claims, 5 Drawing Sheets

OPTICAL COUPLING DEVICE

FIELD OF THE INVENTION

The invention relates to an optical coupling device for optically coupling a laser light source with an optical waveguide, and especially to an optical coupling device with a simple structure and low coupling loss.

BACKGROUND OF THE INVENTION

It is very important to improve the characteristics of an optical coupling device for optically coupling a laser light source with an optical waveguide used in a planar optelectronic circuit from view points of a low coupling loss, high reliability, mass productivity and cost of products. The conventional optical coupling devices used for the aforementioned purpose can be roughly classified into those of two kinds as follows. The optical coupling device of one kind couples the laser light source with the optical waveguide by a lens, and the optical coupling device of the other kind directly couples the laser light source with the optical waveguide via a free space. In the optical coupling device of the former kind, although a low optical coupling loss can be obtained, alignments of optical axes of the laser source and the optical waveguide are complicated, and time and labor consumed in these processes are extremely large. Besides, the cost of the lens is high. In the optical coupling device of the latter kind, a large mount of lightwave energy emitted from the laser light source is radiated into the space outside of the optical waveguide, and the optical coupling loss is extremely high.

SUMMARY OF THE INVENTION

Accordingly, it is an object of the invention to sweep away the aforementioned disadvantages, which cannot be simultaneously eliminated by any one of the two aforementioned conventional optical coupling devices, and provide a novel optical coupling device for optically coupling a laser light source with an optical waveguide, which has a low optical coupling loss, a small size and a light weight, and can be easily manufactured.

According to the invention, an optical coupling device comprises:

a substrate provided with an optical waveguide and a groove precisely aligned with the optical waveguide;

a short optical fiber, which is fitted in the groove, and has a sore with a larger cross-sectional area than that of the optical waveguide and an output end facing an input end of the optical waveguide; and a laser light source having an output end facing an input end of the short optical fiber.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical coupling device for optically coupling a laser light source with an optical waveguide in the preferred embodiment, the aforementioned conventional optical coupling device used for the same purpose will be explained referring to FIGS. 1 and 2.

Figure 1:
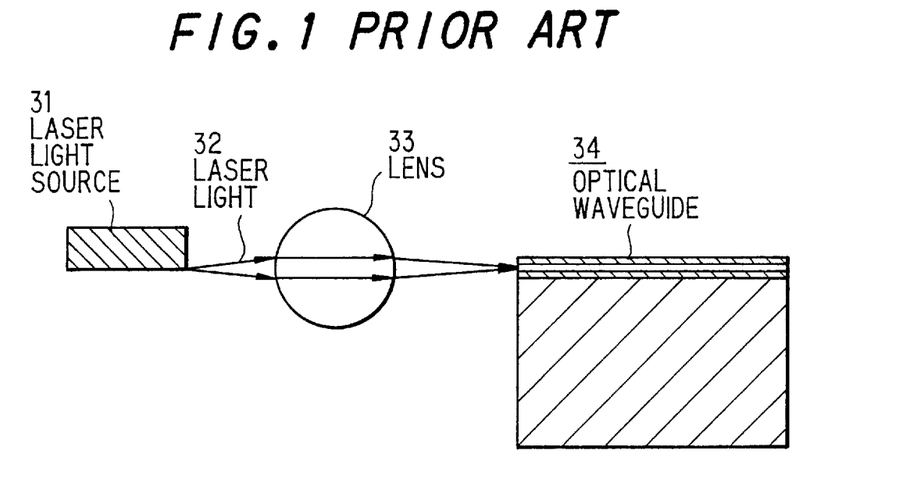
FIG. 1 shows a structure of a conventional optical counting device for optically coupling a laser light source with an optical waveguide.
Figure 2:
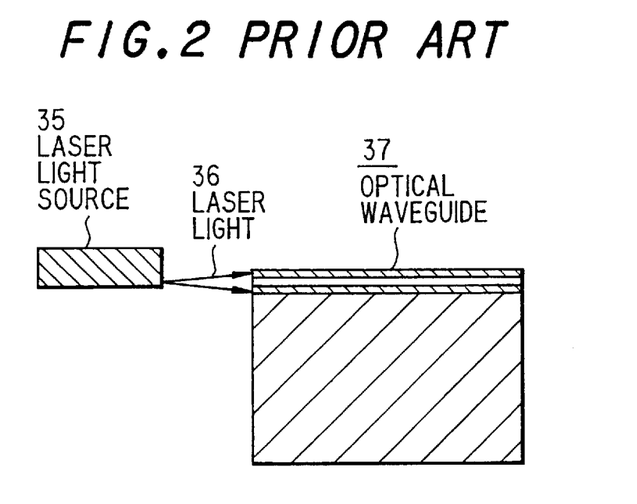
FIG. 2 shows a structure of another conventional optical coupling device used for the same purpose.

FIGS. 1 and 2 are the longitudinal cross-sectional views of the conventional optical coupling devices.

As shown in FIG. 1, in a conventional optical coupling device, a laser light 32 radially emitted from an output end of a laser light source 31 is focalized on an input end of an optical waveguide 34 by a lens 33. Such examples are shown onr FIG. 4 of Japanese Patent Kokai (JPK, hereinafter) No. 5-333248, FIG. 1 of JPK No. 3-287207 and FIG. 1 of JPK No. 3-73905 and etc.

In the other hand, another conventional optical coupling device shown in FIG. 2 is known, in which a laser light 36 emitted from a laser light source 35 is directly coupled with an input end of an optical waveguide 37.

On the optical coupling device shown in FIG. 1, following disadvantages are pointed out. Although optical coupling loss between the laser light source and the optical waveguide is small, because the laser light is focalized by the lens, it takes a long time and requires much labor in assembling the structure shown in FIG. 1. Explaining concretely, the adjustment for aligning the optical axis of the laser light source with that of the lens and the same for aligning the optical axis of the lens with that of the optical waveguide are doubly required. Moreover, means for precisely fixing the lens becomes necessary, and thereby the cost of this optical coupling device inevitably increases. Still more, the cost of the lens is high.

In another conventional optical coupling device shown in FIG. 2, since no means is used for optically coupling the laser light source with the optical waveguide, the cost is the lowest, but the optical coupling loss is too large. The reason is that the greater part of the light radially emitted from the laser light source is not received by the optical waveguide, but leaks out into the free space.

Before explaining an optical coupling device according to the invention in the preferred embodiment, the fundamental principle of the aforementioned beam focalizing property of the GI optical fiber, playing an important role in the invention, will be explained.

In the optical fiber of graded index type (the GI optical fiber, hereinafter), the refractive index of a core is represented as a decreasing parabolic function of the radius of an observation point, and the core diameter is larger than that of the optical waveguide for single mode transmission.

Accordingly, the short GI optical fiber so functions that the laser light supplied to the input end of the short GI optical fiber is focalized on its output end, if the length of the short GI optical fiber is suitably selected.

In the GI optical fiber, the difference of the refractive indexes between the core and the cladding and a numerical aperture (NA, hereinafter) are larger than those of the optical fiber of single mode type, hence, light energy in a wide angle of incidence is transmitted into the GI optical fiber. Accordingly, the efficiency of the optical coupling between the laser light source and the optical fiber can be largely improved. Moreover, since the refractive index of the core of the GI optical fiber parabolically decreases, as the observation point is closer to the periphery of the core, a ray of light propagating through the core of the GI optical fiber oscillates with a certain period, which is independent of the angle of incidence at the input end of the GI optical fiber. Accordingly, the ray of light in the core of the GI optical fiber is focalized, whenever the ray of light advances by a distance equal to a multiple of a half integer of the aforementioned period. By using this property of the GI optical fiber, the laser light radially emitted from the laser light source can be concentrated on its output end, if the length of the short GI optical fiber is selected to be a multiple of a half integer of the aforementioned period.

When the refractive index of the core is perfectly expressed by the decreasing parabolic function of a radius, the period Lp of the oscillatory ray of light propagating through the GI optical fiber is expressed as follows;

$$Lp = (2\pi)^{1/2}/(2\Delta/a) \qquad (1)$$

Where,

Lp: the period of the oscillatory ray of light, $\Delta$: a specific difference of the refractive indexes, $\Delta$ = (the maximum refractive index of core — a refractive index of cladding)/the (maximum refractive index of core), and a: the core radius.

In the GI optical fiber manufactured at present, the eccentricity of the central axis of the core of the GI optical fiber relative to that of the outer periphery thereof is in the order of 1 $\mu$m, and the accuracy of the outer diameter of the GI optical fiber is in the order of 0.1 $\mu$m. Then, in the case of assembling, by forming a V-shaped groove near the input end of the optical waveguide in conformity with the outer periphery of the short GI optical fiber, the central axis of the short GI optical fiber can be easily aligned with the optical axis of the optical waveguide without complicated adjustments of the optical axes. The position of the V-shape groove relative to the optical waveguide can be controlled with high accuracies in nearly the same order as those in fabrications of semiconductor devices by means of photo-lithography.

Moreover, the optical axis of the laser light source can be precisely aligned with the central axis of the short GI optical fiber without complicated adjustments of the optical axes in the case of assembling, by setting a positioning key for the laser light source to be set on the substrate, on which other important structural elements, such as the V-shape groove, the short GI optical fiber and the optical fiber and etc. are mounted.

Next, the optical coupling device for optically coupling laser light source with the optical waveguide according to the invention will be explained in the preferred embodiments referring to the appended drawings.

Figure 3:
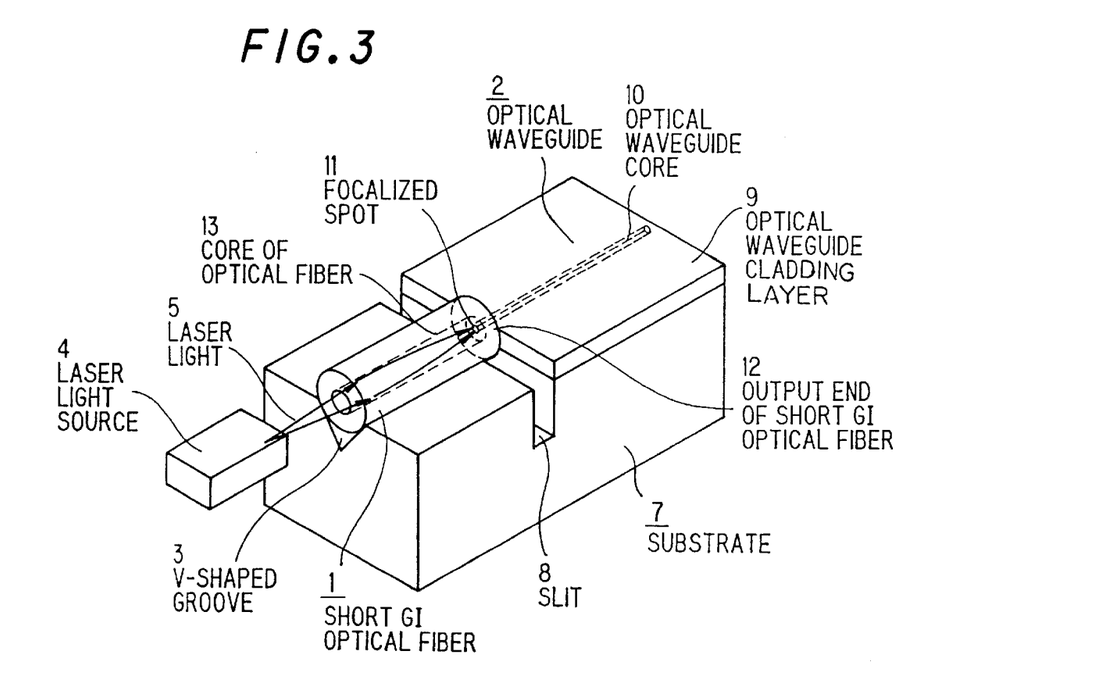
FIG. 3 is a perspective view for showing a structure of an optical coupling device for optically coupling a laser light source with an optical waveguide according to the first preferred embodiment of the invention.
Figure 4:
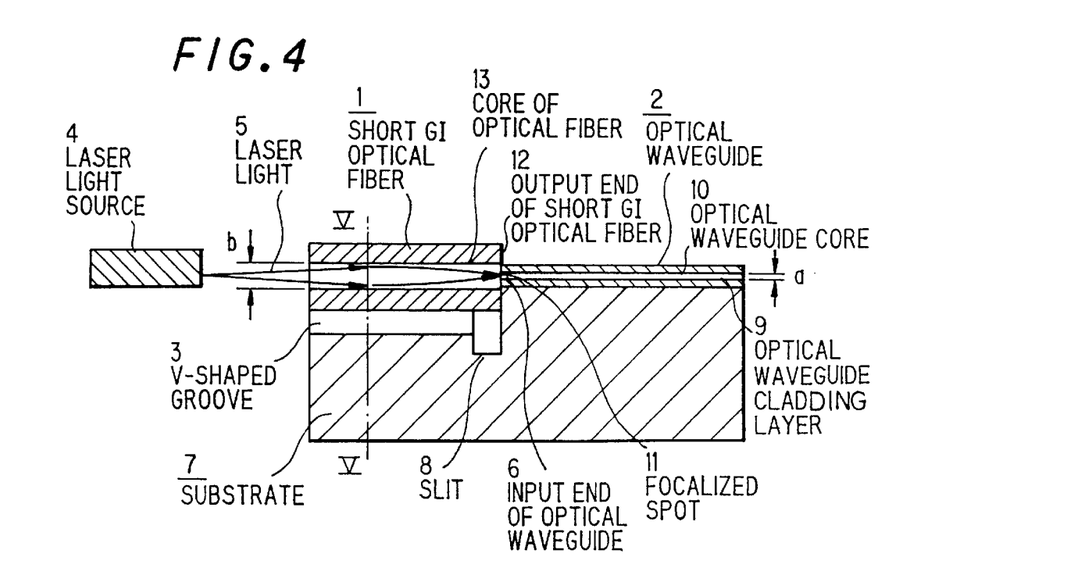
FIG. 4 is a longitudinal cross-sectional view for showing an optical coupling device according to the first preferred embodiment of the invention.

FIGS. 3 and 4 respectively show perspective and longitudinal cross-sectional views of the first preferred embodiment of the invention. As shown in FIG. 4, a short GI optical fiber 1 with the core diameter b is fitted in a V-shaped groove 3, which is set near the input end 6 of the optical waveguide 2 having a core with a square shaped cross-sectional, where the side of the square is a and b>>a. The central axis of the short GI optical fiber 1 fitted in the V-shaped groove 3 is precisely aligned with the optical axis of the optical waveguide 2 formed on the substrate 7.

The optical waveguide 2 and the V-shaped groove 3 are so formed on the same substrate 7 that the directions of them coincide with each other. The optical waveguide 2 is composed of a cladding layer 9 and the core 10, where the refractive index of the former is smaller than that of the latter. These structural elements are formed on the same substrate 7 by evaporation or deposit, and the core is formed by means of dry-etching and etc.

Figure 5:
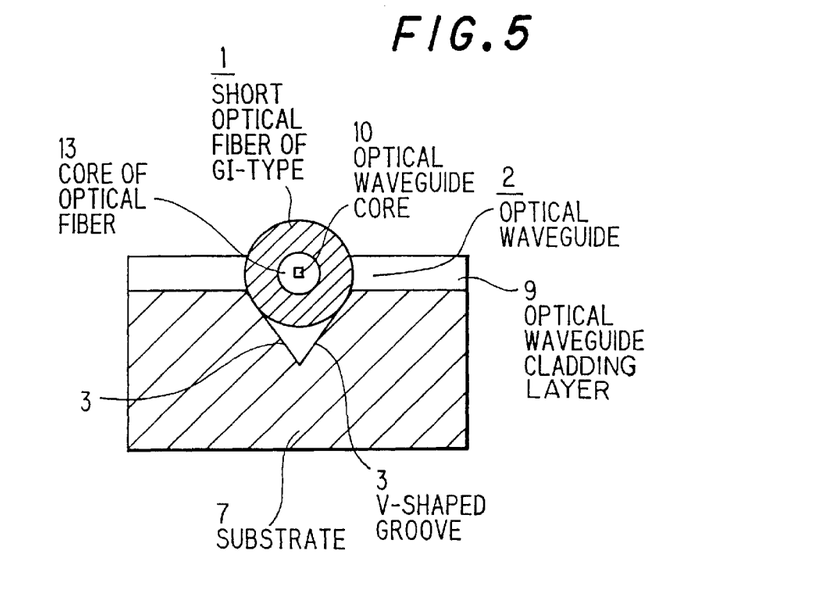
FIG. 5 is a transverse cross-sectional view of an optical coupling device according to the first preferred embodiment of the invention.

FIG. 5 shows the cross-sectional view of the structure shown in FIG. 4 in V—V cross-section. As shown in FIG. 5, the V-shaped groove 3 is so formed that the outer periphery of the short GI optical fiber 1 is tangential to both planer side-surfaces of them. Moreover, the V-shaped groove 3 is so formed that the central axis of a core 13 of the short GI optical fiber 1 coincides with that of the optical waveguide core 10, when the short GI optical fiber 1 is fitted therein, because of the accurate concentric configuration of the core and the outer periphery of the short GI optical fiber.

On the boundary region between the optical waveguide 2 and the V-shaped groove 3, a slit 8 is so formed that the output end of the short GI optical fiber can closely approach the input end of the optical waveguide, and the slit 8 is formed by precise machining by means of a blade saw or etc.

The GI optical fiber commonly used in a practical optical communication can be used as the one in the embodiment of the invention without any processing. The cross-section of the short GI optical fiber is an ideal circle, the outer diameter of which is about 125 to 140 $\mu$m. The diameter of the core is 50 to 100 $\mu$m, and eccentricity of the central axis of the core with respect to that of the outer periphery is about 1 $\mu$m.

The short optical fiber of GI-type is so situated that the output end 12 thereof is positioned at a focalized spot 11 or a point slightly shifted on the side of the short GI optical fiber, in order to transmit the laser light 5 emitted from the laser light source 4 into the optical waveguide core 10. The short GI optical fiber 1 is fixed to both the side surfaces of the V-shaped groove 3 by adhesives, keeping the optical fiber 1 fitted in the V-shaped groove 3. The surfaces of the output end 12 of the short GI optical fiber 1 and the input end 6 of the optical waveguide 2 are abutting or are opposed to each other keeping some clearance.

The substrate 7 is made of silicon or ceramic. The V-shaped groove 3 is formed by etching in case that the substrate 7 is made of silicon, and by precise machining in case that the substrate 7 is made of ceramic.

Next, the operation of the embodiment of the invention in more detail referring to FIG. 4.

The laser light 5 radially emitted from the laser light source 4 is received by the short GI optical fiber 1 with a large NA, which is so fixed that the optical axis of the laser light source and the central axis of the short GI optical fiber are aligned with each other. As mentioned in the above, the ray of light propagating through the core of the short GI optical fiber, having a radial component of pointing vector, oscillates with a certain period Lp around the central axis of the optical fiber, because of the distribution of the refractive index of the core of the GI optical fiber, which becomes parabolically smaller, as the observation point is closer to the outer periphery of the core. Then, the ray of light in the core of the GI optical fiber is periodically focalized at the period of $(n+\frac{1}{2})$ Lp, where n means zero or positive integer and the aforementioned focalized spot is denoted by 11 in FIGS. 3 and 4. By so forming the optical waveguide core 10 that the focalized spot 11 is formed at the input end 6 of the optical waveguide 2, the laser light 5 radially emitted from the laser light source 4 is transmitted into the optical lightwave core 10 with high efficiency. As seen from the above explanation, the length of the short GI optical fiber should be equal to $(n+\frac{1}{2})$ Lp, and this length is second to be Lp/2 in the embodiment shown in FIGS. 3 and 4.

Next, the second preferred embodiment of a optical coupling device according to the invention will be explained referring to FIG. 7 and FIG. 6.

Figure 6:
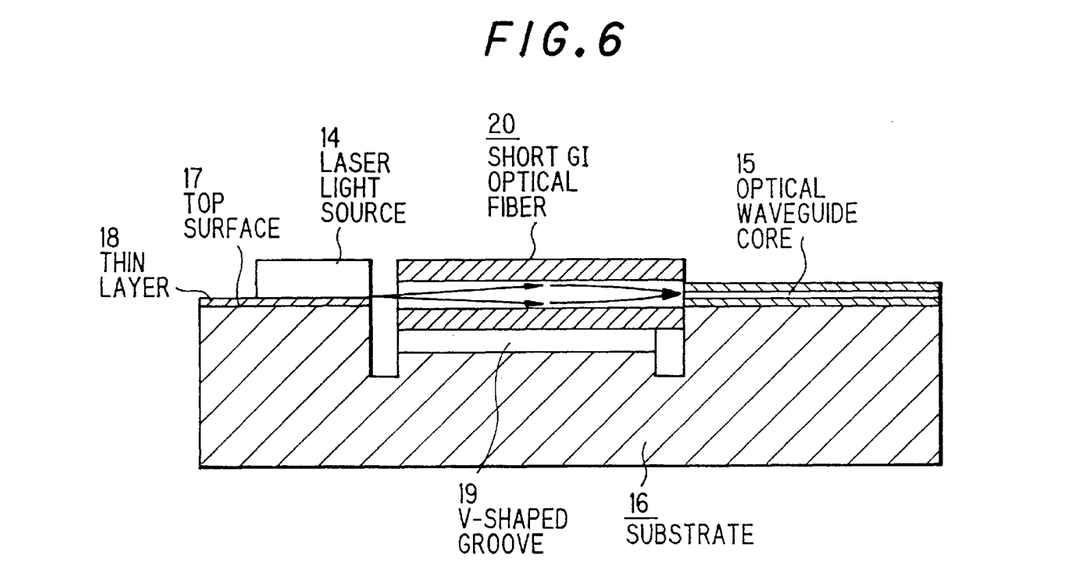
FIG. 6 is a longitudinal cross-sectional view or an optical coupling device according to the second preferred embodiment of the invention.

The feature of the embodiment of the invention shown in FIG. 6 is that a laser light source 14 is mounted on the same substrate 16, also. In most cases, a laser diode (LD, hereinafter) is used as the laser light source 14, in other words, the light emitting area of the LD, is several $\mu$m above the bottom surface of the LD. On the other hand, the optical waveguide core 15 is 10 to 20 $\mu$m above the top surface 17 of the substrate 16. Then, the heights of them disagree with each other, if the LD is placed directly on the substrate 16.

Accordingly, the laser light source 14 is mounted on the substrate 16 via a thin layer 18 with high heat conductivity, in order to make the optical axis of the laser light source 14 align with that of the optical waveguide core 15. The thin layer 18 is produced by means of deposition or evaporation, and silicon which has high transmissibility for infrared ray (IR-ray, hereinafter) is the most suitable material for the thin layer 18. Moreover, the groove 19 is so formed that the central axis of the short GI optical fiber 20 aligns with the optical axis of the optical waveguide core 15.

Figure 7:
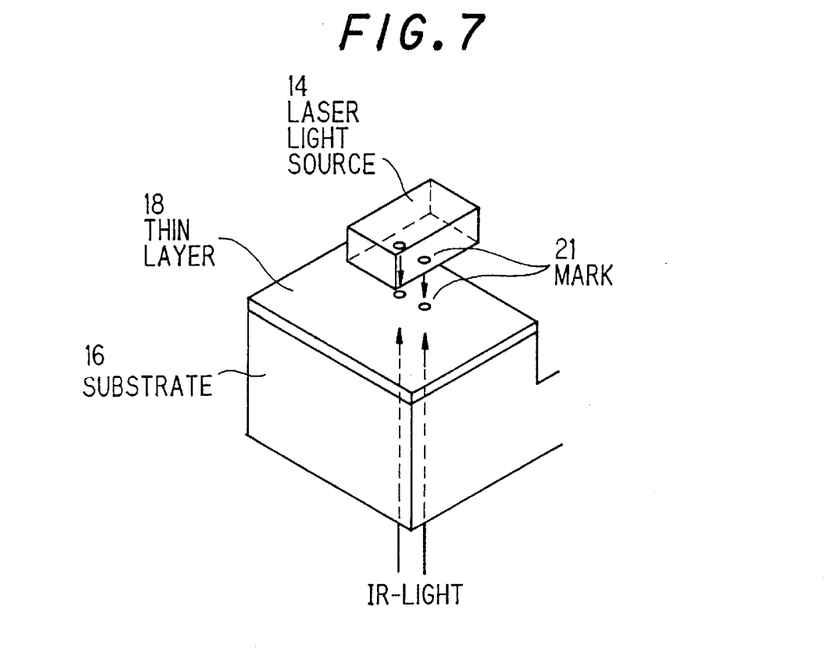
FIG. 7 shows a method of position-alignment of the laser light source on a substrate in the second preferred embodiment shown in FIG. 6.

As shown in FIG. 7, the substrate 16 is made of silicon, and marks 21, which do not transmit IR-ray, are previously set on both the bottom surface of the laser light source 14 and the top surface 17 of the substrate 16. IR-ray is transmitted from the under side of the substrate 16, and the marks 21 are observed from the upper side of the laser light source 14. The position of the laser light source 14 is so adjusted that images of the marks 21 on both the surfaces coincide with each other. By the aforementioned process, the laser light source 14 can be situated at a predetermined position with high accuracy and fixed thereon, without emitting a laser light from the laser light source. Similar effect can be obtained by using such an inverted pattern that a whole surface is covered with a film, which does not transmit IR-ray, and holes are made on regions to be marked. By using these technologies, the laser light source 14 can be fixed at a predetermined position on the substrate 16, where the optical axis of the laser light source 14 is aligned with the central axis of the short GI optical fiber 20 with high precision.

The substrate 16 serves as a heat sink, which conducts heat generated in the laser light source 14 to heat radiating means. The marks 21 are formed by evaporation of metal.

In the aforementioned second preferred embodiment of the invention, both the short GI optical fiber 20 and the laser light source 14 are mounted on the same substrate 16, and thereby the adjustments of the optical axes of optical structural elements can be easily performed. Moreover, the length of the short GI optical fiber 20 is Lp/2 in the embodiment shown in FIG. 6, too.

Next, the third preferred embodiment of the invention on an optical coupling device will be explained referring to FIG. 8.

It is a usual way to align the optical axis of the laser light source, the central axis of the GI optical fiber and the optical axis of the optical waveguide along the same straight line. However, it is the feature of this embodiment that they are positively shifted from the aforementioned straight line within a cross-sectional area of the core of the short GI optical fiber. The effect of the lateral misalignment of the optical axis of the laser light source and the optical axis of the optical waveguide can be compensated by the aforementioned oscillation of the ray of light propagating through the short GI optical fiber by properly selecting the length of the short GI optical fiber.

Figure 8:
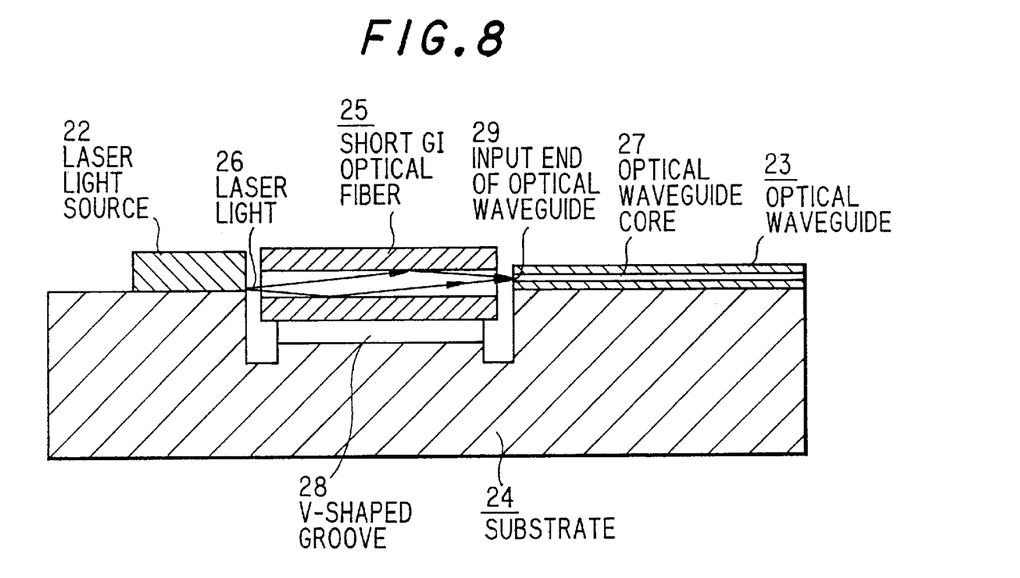
FIG. 8 shows a longitudinal cross-sectional view of an optical coupling device according to the third preferred embodiment of the invention.

In the structure shown in FIG. 8, the laser light source 22 and the optical waveguide 23 are formed and fixed on the same surface. That is to say, since the optical waveguide 23 is formed on a side end of the silicon substrate 24 and the laser light source 22 is mounded on the other side end of the same, the lateral misalignment of the optical axes of the laser light source 22 and the optical waveguide 27 arises because of the difference of the heights between the active layer of the laser light source 22 and the core 27 of the optical waveguide 23. Even in such a case, the active layer of the laser light source 22 is optically coupled with the optical waveguide core 27, as shown in FIG. 8. As mentioned in the above, if the length of the short GI optical fiber is selected to be a multiple of a half integer of Lp given by Eq. (1), the laser light 26 supplied to the input end of the short GI optical fiber 25 is focalized at the input end 29 of the optical waveguide 23, and the effect of the lateral miss-alignment of the optical axes of the laser light source 22 and the optical waveguide 23 can be compensated.

Figure 9:
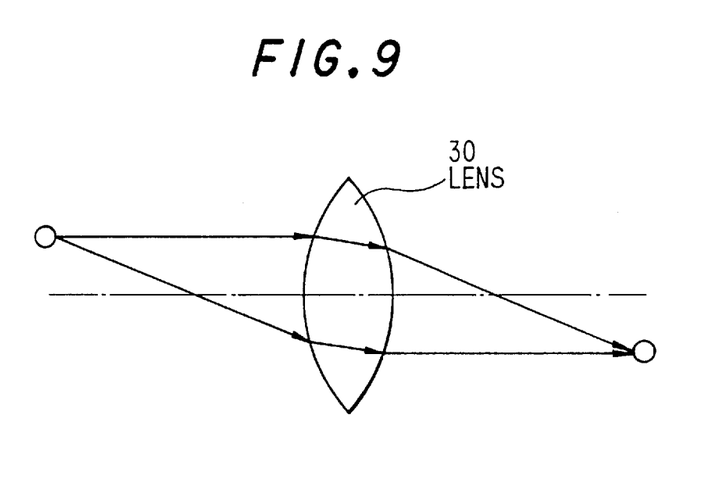
FIG. 9 shows focalization of a ray of light by a lens in the case of oblique incidence.

In the structure shown in FIG. 8, the optical waveguide core 27 is higher than the laser light source 26 emitted from the laser light source 22. In such a case, the V-shaped groove 28 is so formed that the central axis of the short GI optical fiber 25 is situated in the middle of a region interposed by the optical axes of the laser light source 22 and the optical waveguide 27. Moreover, the length of the short GI optical fiber 25 is selected to be equal to a multiple of a half integer of Lp obtained from Eq. (1) in order to focalize the ray of light in the core of the short GI optical fiber 25 at input end 29 of the optical waveguide 23, as shown in FIG. 8. The principle of the embodiment mentioned in the above is based on the fact that the beam focalizing property of the short GI optical fiber 25, having the core with the parabolic distribution of its refractive index, is similar to that of a lens 30 in the case of oblique incidence shown in FIG. 9. When the laser light source 22 is fixed on the top surface of the substrate 24 for assembling, positioning of the laser light source 22 can be carried out without adjustment of optical axes by means of a positioning key (not shown) similarly to the case of the second preferred embodiment.

In the embodiment shown in FIG. 8, the ray of light propagating through the short GI optical fiber 25 lies in a plane perpendicular to the substrate 24, hence, the feature of this embodiment can be expressed as, the optical axis of the optical waveguide, the central axis of the optical fiber and the optical axis of the laser light source lie together in a plane perpendicular to the top surface of the substrate, and the optical axis of the optical waveguide, the central axis of the optical fiber and the optical axis of the laser light source respectively have different heights from the top surface of the substrate.

On the other hand, another embodiment can be devised, in which the ray of light propagating through the short GI optical fiber 25 lies in a plane in parallel with the substrate 24. In such a case, the feature of the embodiment can be expressed as, the optical axis of the optical waveguide, the central axis of the optical fiber and the optical axis of the laser light source respectively have the same heights from a top surface of the substrate, and the optical axis of the optical waveguide, the central of the optical fiber and the optical axis of the laser light source deviate from a certain straight line superimposed on a plane, on which the optical axis of the optical waveguide, the central axis of the optical fiber and the optical axis of the laser light source lie together.

As mentioned in the above, in the third preferred embodiment of the invention, the low optical coupling loss can be obtained by setting a short GI optical fiber 25 between the laser light source 22 and the optical waveguide 23, even when the optical axes of the laser light source 22 and the optical waveguide are deviated from each other. Moreover, the length of the short GI optical fiber 25 is Lp/2 in the embodiment shown in FIG. 8, too.

Finally, particular supplements on structures, fabrications and operations of the respective embodiments of the invention will be appended to the aforementioned explanations on the same subjects.

In the structure of the first preferred embodiment of the invention shown in FIGS. 3 and 4, the outer diameter of the short GI optical fiber is 125 $\mu$m and the diameter of the core is 50 $\mu$m. Accuracy of the outer diameter of the manufactured optical fiber is in the order of 0.1 $\mu$m. In case that the substrate 7 is made of silicon, the V-shaped groove 3 is formed by means of selective etching, and an angle made by two side planes is 54.7°. In case that the substrate 7 is made of ceramics, crystallized glass, alumina, zirconia or etc. is used as material thereof, and the V-shaped groove is formed by a precise grinding machine with a blade or a metallic mold, and the angle made by both the side planes is about 50° to 90°.

In the optical waveguide 2, the cladding layer 9 is made of quartz ($SiO_2$), and the core 10 is made of quartz ($SiO_2$) doped with a oxide of germanium (Ge), titanium (Ti), or phosphor (P) in order to obtain the core, the refractive index of which is larger than that of the cladding. Moreover, lithium niobate ($NiNbO_3$) doped with titanium (Ti) by diffusion process can be used as another kind of material of the optical waveguide core 10. The cross-sectional area $a^2$ of the core 10 is less than $10 \times 10$ $\mu m^2$ in most cases. The thickness of the cladding is about 10 to 30 $\mu$m, accuracy of which is regulated within a range in the order of 0.1 $\mu$m. The slit 8 is formed by a precise grinding process using a blade saw, and the width of the slit 8 is about several tens $\mu$m to 100 $\mu$m. The depth of the slit 8 is deeper than the lowest end of the V-shaped groove to some extent.

As a modification of the embodiment shown in FIG. 5, a structure, in which the V-shaped groove 3 is replaced with a trapezoidal one by flattening the bottom portion of the V-shaped groove 3, can be devised.

The structures and the data mentioned in the above are in common with the other embodiments mentioned in latter.

In FIG. 6 showing the second preferred embodiment, if the active layer of the laser light source is 4 $\mu$m high above the bottom surface thereof and the central axis of the optical waveguide core 15 is 20 $\mu$m high above the top surface of the substrate 16, the optical axis of the laser light source 14 is aligned with that of the optical waveguide core 15, by selecting the thickness of the silicon thin layer 18 to be 16 $\mu$m. In the embodiment shown in FIG. 7, the marks 21 are made of evaporation of gold.

Next, the operation of the embodiment of the invention will be explained referring to FIG. 3.

In the optical coupling device according to the invention, the optical axis of the optical waveguide core 10 can be easily aligned with the central axis of the core 13 of the short GI optical fiber 1, by fitting the short GI optical fiber 1 with a length Lp/2 in the V-shaped groove 3, which is previously aligned with the optical waveguide core 10 with high precision, and fixing the optical fiber 1 thereto. In the optical coupling device, the structure, in which the output end of 12 of the short GI optical fiber 1 and the input end 6 of the optical waveguide 2 are abutting and are fixed thereafter, is suited for aligning the axes of the cores of the short GI optical fiber 1 and the optical waveguide 2 along the same axis, and has excellent productivity, as compared with the other structure, in which there is some clearance between the output end 12 of the short GI optical fiber 1 and the input end 6 of the optical waveguide 2.

Finally, the optical axes of the optical waveguide thus completed as a module and the laser light source are aligned in axial and lateral directions, and assembling is completed.

Next, the operation of the second embodiment of the invention will be explained in more detail referring to FIGS. 6 to 7.

Fabrication of the optical coupling device according to the second preferred embodiment of the invention can be carried out similarly to the case of the aforementioned embodiment. That is to say, the short GI optical fiber 20 is fitted in and fixed to the V-shaped groove 19, and the marks 21 for position-adjustment of the laser light source 14, which are previously formed on both the laser light source 14 and the thin layer 18 covering the top surface of the substrate 16, are irradiated by IR-ray emitted from the under side of the substrate 16, and the images of the marks 21 seen from the upper side of the substrate 16 are so adjusted that they coincide with each other. Then, the laser light source 14 is fixed to the substrate 16 by soldering the aforementioned marks 21 or adhesive.

Next, the operation of the optical coupling device according to the third preferred embodiment of the invention will be explained referring to FIG. 8.

Fabrication of the optical coupling device can be similarly carried out to the case of the previous embodiment. That is to say, the short optical fiber 25 is fitted in and fixed to the V-shaped groove 28, and the laser light source 22 are fixed to the top surface of the substrate 24 by the aid of the marks (not shown) for position-adjustment of the laser light source 22.

The effect of the invention can be summarized as follows.

In an optical coupling device according to the invention, since the short optical fiber inserted between the laser light source and an optical waveguide has light focalizing property, the low optical coupling loss can be obtained by a simple structure. Because of the aforementioned feature of this configuration, the optical coupling device with excellent performance and high reliability can be manufactured.

The optical coupling device according to the invention can be easily fabricated within a short time, and suited for mass production. That is to say, this device can be fabricated by fitting the short GI optical fiber in the V-shaped groove previously aligned with the optical waveguide, and the position-adjustment of the laser light source can be easily carried out with high precision by the aid of the previously arranged marks for positioning the laser light source, without using the laser light.

As mentioned in the above, the optical coupling device according to the invention not only can be precisely fabricated and has excellent mass productivity, but also has a great advantage from a view point of cost of products as compared with conventional ones, because the short GI optical fiber of low cost can be used as an element for focalizing the laser light. Moreover, the optical coupling device according to the invention has another feature that a low loss optical coupling loss can be achieved between the laser light source and the optical waveguide, even in case that these optical axes cannot be aligned along the same axis. The reason is that, the laser light emitted from the laser light source can be concentrated on the input end of the optical waveguide core, because the lateral misalignment of these optical axes can be compensated by the oscillation of a ray of light propagating through the short GI optical fiber.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical coupling device, comprising:
    a substrate provided with an optical waveguide and a groove precisely aligned with said optical waveguide;
    a short optical fiber, which is fitted in said groove, and has a core with a larger cross-sectional area than that of said optical waveguide and an output end facing an input end of said optical waveguide; and
    a laser light source having an output end facing an input end of said short optical fiber.

2. An optical coupling device, comprising:
    a substrate comprising an optical waveguide and a groove aligned with said optical waveguide;
    a graded index optical fiber in said groove and having a core with a larger cross-sectional area than that of said optical waveguide and an output end facing an input end of said optical waveguide; and
    a laser light source having an output end facing an input end of said optical fiber;
    said optical fiber is of a length by which light emitted from said laser light source is focused on an end plane of said optical waveguide.

3. An optical coupling device, according to claim 1, wherein:
    said groove has a V-shaped cross-section.

4. An optical coupling device, according to claim 2, wherein:
    said output end of said optical fiber contacts to said input end of said optical waveguide.

5. An optical coupling device, according to claim 1, wherein:
    said laser light source is mounted on said substrate.

6. An optical coupling device, comprising:
    a substrate comprising an optical waveguide and a groove aligned with said optical waveguide;
    a short optical fiber in said groove and having a core with a larger cross-sectional area than that of said optical waveguide and an output end facing an input end of said optical waveguide; and
    a laser light source mounted on said substrate and having an output end facing an input end of said optical fiber; and
    a thin layer with high heat conductivity formed between said laser light source and said substrate.

7. An optical coupling device, according to claim 2, wherein:
    an optical axis of said laser light source deviates from a central axis of said optical fiber within a cross-sectional area of said core of said optical fiber.

8. An optical coupling device, according to claim 2, wherein:
    said central axis of said optical fiber deviates from said optical axis of said optical waveguide within said cross-sectional area of said core of said optical fiber.

9. An optical coupling device, according to claim 2, wherein:
    said optical axis of said optical waveguide, said central axis of said optical fiber and said optical axis of said laser light source respectively have same heights from a top surface of said substrate; and
    said optical axis of said optical waveguide, said central axis of said optical fiber and said optical axis of said laser light source deviate from a certain straight line supposed on a plane, on which said optical axis of said optical waveguide, said central axis of said optical fiber and said optical axis of said laser light source lie together.

10. An optical coupling device, according to claim 2, wherein:
    said optical axis of said optical waveguide, said central axis of said optical fiber and said optical axis of said laser light source lie together in a plane perpendicular to said top surface of said substrate; and
    said optical axis of said optical waveguide, said central axis of said optical fiber and said optical axis of said laser light source respectively have different heights from said top surface of said substrate from each other.

11. An optical coupling device, according to claim 2, wherein:
    said substrate is provided with a slit vertical to said optical waveguide near a point, where said output end of said optical fiber and said input end of said optical waveguide are opposed to each other.

12. An optical coupling device, according to claim 2, wherein:
    said laser light source is provided with position adjustment means for aligning an optical axis of said laser light source with a central axis of said optical fiber.

13. An optical coupling device, according to claim 12, wherein:
    said position adjustment means is composed of two marks formed on a bottom surface of said laser light source and two same marks with a same interval formed on a top surface of said substrate as those formed on said under surface, and correct position adjustment is detected through coincidence of said marks respectively formed on said under and top surfaces.

14. An optical coupling device, comprising:
    a substrate with a V-shaped groove therein;
    a laser light source for emitting a laser light aligned with an axis of said groove;
    an optical fiber of a predetermined limited length mounted in said groove next to said source and having an input end for receiving said laser light directly from said source and an output end for radiating said laser light received at said input end; and
    an optical waveguide having an input end for receiving said laser light directly from said output end of said optical fiber, said optical waveguide for propagating said laser light therethrough.

15. An optical coupling device, according to claim 14, wherein:
    said optical fiber is a graded index optical fiber having a length for focusing the laser light on an end plane of said optical waveguide.

16. An optical coupling device, according to claim 14, wherein:

said substrate is divided into first and second regions by a slit, said optical fiber being mounted on said first region of said substrate, and said optical waveguide being fabricated on said second region of said substrate.

17. An optical coupling device, according to claim 14, wherein:

said laser light source is mounted on a first region of a substrate, said optical fiber is mounted on a second region of said substrate, and said optical waveguide is fabricated on a third region of said substrate, said first, second and third regions of said substrate being divided by first and second slits, respectively, and said second region of said substrate having a V-shaped groove for positioning said optical fiber to be aligned with said laser light source and said optical waveguide.

18. An optical coupling device, comprising:

a substrate having a slit dividing said substrate into first and second regions, said first region having a V-shaped groove therein that is transverse to said slit;

a source of laser light;

an optical fiber of predetermined length mounted in said V-shaped groove having an input end coupled to said source and an output end for radiating light from said source; and an optical waveguide having an input end coupled to said output end of said optical fiber, said optical waveguide being axially aligned with said optical fiber mounted in said V-shaped groove.

19. The optical coupling device of claim 18, wherein said optical fiber is a graded index optical fiber.

20. The optical coupling device of claim 18, wherein said predetermined length is an integer multiple of one half a period of an oscillatory ray of light propagating through said optical fiber.

\* \* \* \* \*